Oct. 9, 1928.
E. H. FITCH
1,687,330
RESILIENT VEHICLE TIRE
Filed May 10, 1922
FIG. I.
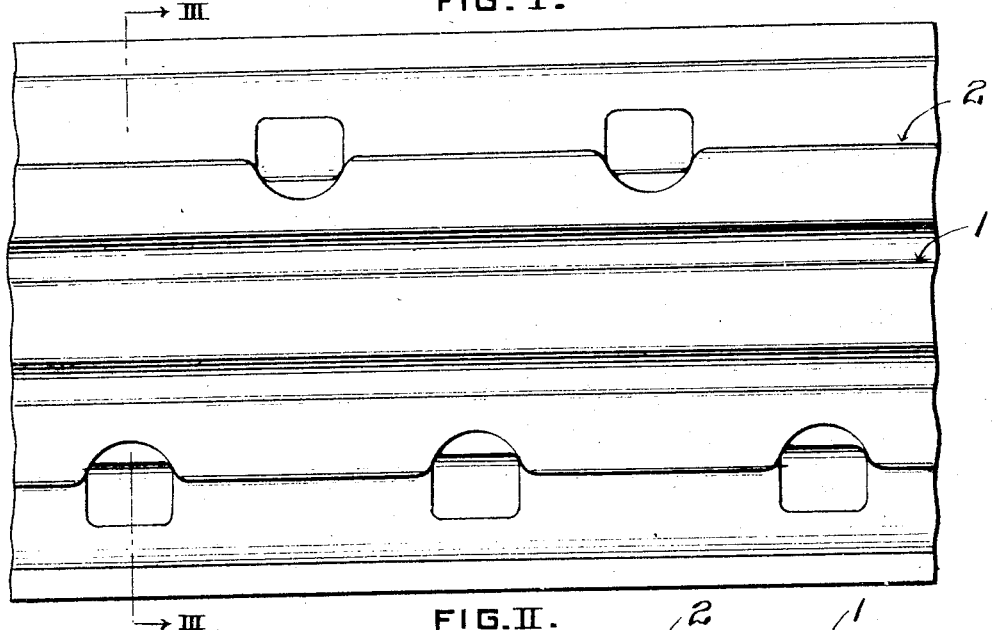
FIG. II.
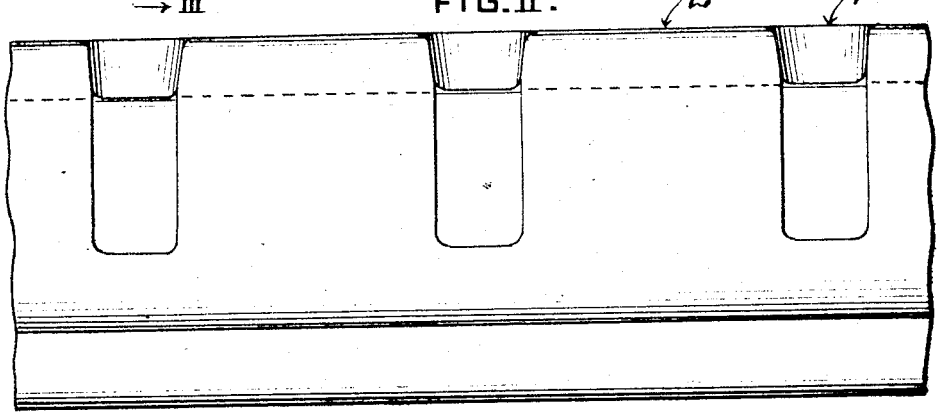
FIG. III.
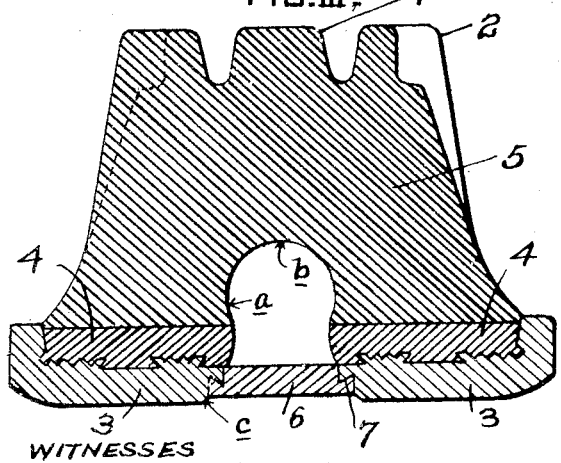
FIG. IV.
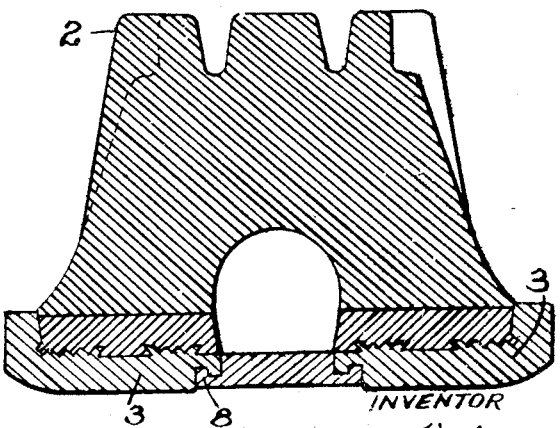
WITNESSES
INVENTOR
Edward H. Fitch
by Christy and Christy
his attorneys Patented Oct. 9, 1928.

1,687,330

UNITED STATES PATENT OFFICE.

EDWARD H. FITCH, OF HUDSON, OHIO; BESSIE McFARLIN FITCH, EXECUTRIX OF SAID EDWARD H. FITCH, DECEASED, ASSIGNOR TO THE B. F. GOODRICH COMPANY, A CORPORATION OF NEW YORK.

RESILIENT VEHICLE TIRE.

Application filed May 10, 1922. Serial No. 559,771.

My invention relates to improvements in resilient vehicle tires, and, more particularly, in cushion tires for the wheels of trucks, and consists in a tire which, by virtue of particular features of structure, is effective and durable in high degree.

In the accompanying drawings Fig. I shows in plan from above, and Fig. II in side elevation, the tire of my invention. And in these views it will be perceived that the curve of the tire has for simplicity of illustration been left out of account, and the longitudinal lines of the tire are drawn as straight lines. In this respect the showing is diagrammatic. Fig. III is a view in transverse section, on the plane indicated by the line III—III, Fig. I. Fig. IV is a like transverse sectional view of a tire embodying certain modifications in detail.

The tire, as clearly appears in Figs. III and IV, is in its general outline trapezoidal in cross-section, with a hollow at the center, opening through a cleft base—a shape of well-recognized excellence.

The first of the improvements to which I direct attention and in the co-operation of which my invention is found, lies in surface configuration. The tread is shaped to resist both skidding and spinning strains, that is to say, strains tending to cause slip in both lateral and longitudinal directions. On the mid-line of the tread of the tire is an outstanding continuous protrusion or ridge 1; on either side is a line of longitudinally extending lugs 2, arranged in echelon formation, such in general form and arrangement as illustrated and described in United States Letters Patent No. 898,907, granted September 15, 1908, on the application of Tod J. Mell, to the Republic Rubber Company, of Youngstown, Ohio. These marginal lugs 2 longitudinally interconnected stand out laterally from the sides of the tire, and form laterally outstanding blocks with recesses between. This is a feature of structure which in service is particularly valuable where roads are heavy; the laterally outstanding blocks take better purchase in soft ground, and tend to prevent spinning and to afford increased tractive effect.

To the extent that slip-preventing surface irregularities are effective, to the extent that they by their presence afford a firmer hold upon the road, the body of the tire must be strong to endure the additional strains to which it consequently is subjected. More than a plain-surfaced tire, it must be strong to endure incessantly repeated accidental momentary strains, exerted in any and in all directions, and of indeterminate and varying intensity.

The second feature of improvement is that the hollow annular air chamber at the center of the tire, so shaped as to be adapted to conditions of commercial production, is still so shaped as to afford the widest distribution of service strains through the body of the tire. To this end it will be observed that while the cleft through which this hollow air chamber opens is substantially as wide as the air chamber itself at its point of maximum width, the lateral walls $a$ of this air chamber do not extend in vertical planes, but are bowed. In the form shown in Fig. III these wall surfaces are bowed in cyma reversa or double and reverse curves, and the maximum diameter of the hollow space is identically the width of the cleft in the base of the tire; in the form shown in Fig. IV the walls are bowed laterally in single curvature, and to a maximum diameter slightly exceeding the width of the cleft in the base. By virtue of such curvature compression strains are more widely distributed. The departures from the vertical are not, however, so great as to cause difficulty in the removal of the core upon which the tire is built and after building vulcanized.

These tires are as the drawings indicate built of rubber on a foundation of metal. There must be a minimum amount of distortion of the tire, after it has been built and vulcanized, in removing the core from it; for, otherwise, there may be weakening of the bond between metal base and rubber body. And of course there should be maximum facility in core removal.

The arch $b$ of the central hollow space or air chamber is, it will be remarked, rounded, and the curve is continuous from the side walls across the center line or dome of the air chamber. This feature makes for the best distribution, particularly of transverse strains.

A third feature of improvement concerns the metallic base, of which mention has just been made. The tire is cleft; the base, as I construct it, is a three-piece interlocking base and consists of two complementary hoops 3 of steel and a locking ring 6 also of steel. The manner of building is this: The pair of hoops 3 are assembled with a core. Upon the hoops and on either side of the core are wrapped, first, the layers 4 of hard rubber, and then the soft rubber body 5 of the tire is built up, surrounding the core and integrating the whole. Of course, if it be desirable, the initial application of rubber to hoop may be made before assembling the pair of hoops with a core. When the tire has been built it is compressed within a mold, and by compression surface configuration such as that described is imposed upon the tire. Vulcanization follows. The mold is then opened, the tire released, and, ultimately, the core is withdrawn through the cleft base from the hollow within.

It will be observed that the layers 4 of hard rubber are mechanically locked to the hoops 3 by serrations and dovetailing and marginal hooking of hoop around rubber, as well as being bonded to the metal by adhesion. But these are known features, and do not require more particular description here.

Between the hoops 3 and uniting them and securing and solidifying the whole is a locking ring 6. This ring is introduced after the tire has been formed and vulcanized, and after the core has been removed from the central hollow. This ring is united with the hoops 3 by the lateral interlocking shown in alternative form in Figs. III and IV. In the form shown in Fig. III there is oblique surface engagement at 7, resisting spreading tendencies between the hoops; in Fig. IV a toothed interlock is indicated at 8. Both forms will readily be understood, and the fact will be appreciated that, whereas the particular shape illustrated in Fig. III is such as to require machining of the meeting surfaces —or at least to make machining desirable, the shape illustrated in Fig. IV is such as may be produced by rolling.

The ring 6, unlike bands previously used in other tires, is continuous and without break. This is a matter of particular importance in a tire such as mine, which in service has to endure great internal strain. A split band (and hitherto nothing but a split band has been proposed) proves itself under heavy load and at high speed inadequate. The tire is not durable. I find that it is possible to make this band a continuous ring without break, and in so doing to overcome the difficulty and the defect of former projects in the same direction.

I form and introduce the ring in one of two ways: either I prepare it as a broken band, collapse it, enlarge it again to place, and then spot-weld its ends together; or, I make it under size as a continuous and endless ring, bring it to position opposite the space which it is to occupy, and then expand it to place by direct spreading pressure or by spinning, or by equivalent operation. In this latter alternative it will be understood that the material of the ring must be such as to lend itself to the expanding operation,—low carbon steel, for example.

I am careful that the ring when seated shall clear the inner surface of the tire, so that there shall be no difficulty in applying the tire to the felly of a wheel. The ring is after expansion as great as or greater than the hoops 3 in interior diameter. There may be clearance here of a sixty-fourth of an inch, more or less. To the same end, in order that there may be no interference with the free application and removal of the tire, the corners c at the inner edges of the hoops 3 may be bevelled.

I claim as my invention:

1. A vehicle tire of cushion type having an annular resilient body cleft interiorly and concentrically by an annular air chamber extending into the body of the tire the dome of this chamber being arched and its side walls bowed laterally and oppositely in cyma reversa curves.

2. A vehicle tire of cushion type having an annular resilient body cleft interiorly and concentrically by an annular air chamber to a depth approximating the center of the structure, the dome of this chamber being arched and its side walls bowed laterally and oppositely in cyma reversa curves.

3. A vehicle tire of cushion type having an annular resilient body cleft interiorly and concentrically by an annular air chamber, the dome of this chamber being arched and its side walls bowed laterally and oppositely in cyma reversa curves, in a combination with a road-gripping tread surface including a projecting ridge in alinement with the air chamber aforesaid.

4. A vehicle tire of cushion type having an annular resilient body cleft interiorly and concentrically by an annular air chamber, the dome of this chamber being arched and its side walls bowed outwardly, in combination with a tread surface having a central circumferential projecting ridge of a width approximating that of the air chamber and in vertical alinement therewith.

5. A vehicle tire of cushion type having an annular resilient body cleft interiorly and concentrically by an annular air chamber, the dome of this chamber being arched transversely and its side walls bowed outwardly, in combination with a suitable base for the tire including an endless band arranged and adapted to close and seal the constricted entrance to said air chamber, and a vulcanized union between said tire and base.

6. A vehicle tire comprising a resilient cushion tire body, and a base assembly including a pair of metallic base rings to which said tire body is vulcanized, and structurally separate means inset radially with relation to the inner peripheries of said base rings for locking them against relative lateral separation, said base assembly having provision for retaining said locking means against radial inward displacement.

7. A vehicle tire comprising a resilient cushion tire body, a pair of metallic base rings to which said tire body is vulcanized, and an intermediate ring self-retained in interlocked engagement with said base rings as to relative separating movement and inset radially with relation to the inner peripheries of said base rings.

8. A vehicle tire comprising a resilient cushion tire body, a pair of metallic spaced-apart base rings to which said tire body is vulcanized, and an intermediate annular circumferential locking element inset radially with relation to the inner peripheries of said base rings and positively self-retained in engagement with said base rings by reason of its circumferential length and interlocking engagement with the base rings for locking them against relative lateral movement in both directions.

In testimony whereof I have hereunto set my hand.

EDWARD H. FITCH.